United States Patent
Pflügl et al.

(10) Patent No.: US 6,594,575 B2
(45) Date of Patent: Jul. 15, 2003

(54) MODEL BASED ON-LINE OPTIMIZATION METHOD

(75) Inventors: Horst Pflügl, Seiersberg (AT); Andreas Riel, Graz (AT); Kurt Gschweitl, Eggersdorf (AT)

(73) Assignee: AVL List GmbH, Graz (AT)

( * ) Notice: Subject to any disclaimer, the term of this patent is extended or adjusted under 35 U.S.C. 154(b) by 61 days.

(21) Appl. No.: 09/780,889

(22) Filed: Feb. 9, 2001

(65) Prior Publication Data

US 2002/0019695 A1 Feb. 14, 2002

(30) Foreign Application Priority Data

Feb. 9, 2000 (AT) .......................................... 90/2000 U

(51) Int. Cl.$^7$ ........................... G06F 19/00; G05B 13/00
(52) U.S. Cl. ........................... 701/102; 701/115; 700/28; 700/31
(58) Field of Search ............................... 701/103, 105, 701/114, 110, 115, 101, 102; 700/29, 28, 31, 32

(56) References Cited

U.S. PATENT DOCUMENTS

| | | | | |
|---|---|---|---|---|
| 5,394,322 A | * | 2/1995 | Hansen | 700/32 |
| 5,682,309 A | | 10/1997 | Bartusiak et al. | 700/29 |
| 5,978,083 A | * | 11/1999 | Muller | 356/318 |

FOREIGN PATENT DOCUMENTS

| | | | | |
|---|---|---|---|---|
| DE | 197 04 314 C1 | | 9/1998 | |
| JP | 11-203335 | | 7/1999 | |
| JP | 2001-47340 | * | 2/2001 | B23Q/15/00 |

OTHER PUBLICATIONS

A Note On Step–Size Restrictions in Approximation Procedures For Structural Optimization Computers and Structures by O. Jonsson, et al (pp. 259–263) 1990.

A New Algorithm for Reactive Power Optimization Based On Primal–dual Interior Point Method from proceedings of the International Conference on Electrical Engineering (pp. 1009–1013) Aug. 12, 1996.

Optimal Power Flow Solutions Using the Gradient Projection Method IEE Proceedings, vol. 137 Pt. C., No. 6, Nov. 1990 (pp. 424–428) Nov., 1990.

* cited by examiner

*Primary Examiner*—Hieu T. Vo
(74) *Attorney, Agent, or Firm*—Sonnenschein Natah & Rosenthal

(57) ABSTRACT

A method for the automatic optimization of an output quantity of a system that is dependent on a plurality of input quantities (for example, an internal combustion engine) with maintenance of secondary conditions determines a theoretical value for the output quantity and for the secondary conditions on the basis of a respective model function having the input quantities as variables, and thereby respectively modifies, in successive individual steps, one of the input quantities within a variation space having a dimension corresponding to the number of input quantities, whereby values, corresponding to the respective input quantities, for the output quantity and for the secondary conditions are also determined directly at the system and are used for the correction of the model functions, until the model function has achieved its optimal value, satisfying the secondary conditions, for the output quantity. In order to reach an assured optimal value for the system more rapidly and with lower expense, in a first stage the modification of the input quantities for the calculation and determination at the system takes place in an arbitrarily predetermined sequence, whereby for each input quantity an individual predetermined step size is not exceeded, and, after the predetermined sequence has been processed, the combination of input quantities that is closest to the optimal value is used as the starting point for the second stage.

23 Claims, 1 Drawing Sheet

MODEL BASED ON-LINE OPTIMIZATION METHOD

BACKGROUND OF THE INVENTION

The invention relates to a method for the model-based automatic optimization of an output quantity of a system that is dependent on a plurality of input quantities, for example an internal combustion engine, with maintenance of secondary conditions, whereby a theoretical value is determined for the output quantity and for the secondary conditions on the basis of a respective model function having the input quantities as variables, and in successive individual steps one of the input quantities is respectively modified inside a variation space having a dimension corresponding to the number of input quantities, whereby values, corresponding to the respective input quantities, for the output quantity and for the secondary conditions, are also determined directly at the system and are used for the correction of the model functions, until the model function has achieved its optimal value, fulfilling the secondary conditions, for the output quantity.

Known methods for the optimization of nonlinear systems in which a quantity to be optimized is dependent on a plurality of input quantities are very difficult and expensive for complex contexts. This is true in particular of online optimization methods, in which the corresponding calculations and measurements must take place extremely rapidly in order to acquire the changes in the system and in the models on which all cases are based, and in which the number of measurements required is to be kept low in order to save costs. In particular, this is the case for example for a function that depends on arbitrarily many input variables and that is to be minimized by modifying these variables, while at the same time arbitrarily many other functions that depend on the same variables should not exceed or, respectively, fall below a particular boundary value (optimization with maintenance of secondary conditions, extreme value tasks subject to secondary conditions, method of Lagrange,: constrained optimization). An example of a specific application can be found in the literature under "Model Assisted Pattern Search."

Thus, methods are known in which the overall variation space is covered and measured in the form of a grid. With the aid of what is known as sequence variation, a finer grid measuring is started in the vicinity of the optimum found up to that point using model calculation and optimization. Following this sequence variation, an optimum is calculated on the basis of all previous measurements, and at this point an individual measurement is once again carried out. In addition, gradient search methods are also known in which, with the aid of the immediately preceding measurements, an attempt is made to find the direction of descent having the steepest gradient. The adjustment, whose step width standardly depends on the steepness of the gradient, is then carried out in the found direction. Given measurement values having a high degree of noise, which occur in particular given small step widths that are used at the beginning, the direction of descent can likewise vary arbitrarily. In general, therefore, the method yields the correct result in reproducible fashion only given very stable measurement values. Moreover, given a variable step width the number of measurements (which are very expensive) is relatively high.

SUMMARY OF THE INVENTION

It was therefore the object of the present invention to improve an optimization method of the type named above in such a way that it leads to an assured optimal value for the system more rapidly and with a lower expense.

This object is achieved according to the invention in that in a first stage the modification of the input quantities for the calculation and determination at the system takes place in an arbitrarily predetermined sequence, whereby for each input quantity an individual predetermined step size is not exceeded, and after the predetermined sequence has been processed the combination of input quantities that is closest to the optimal value is used as the starting point for the second stage. The model functions contain the influence of all input variables. For the target function (the function that is to be minimized) as well as for the secondary conditions there is thus respectively only one model that simultaneously takes into account all influencing quantities. At the beginning of the optimization, a particular region that is also somewhat larger is "scanned" according to a particular predefined pattern. On the basis of the values determined at the system—and the model formation, which is thereby statistically better—in a subsequent second stage the optimal value for the output quantity under consideration can then be found with a very low number of additional steps. The arbitrary combination of input quantities modified together or individually allows not only "orthogonal" scanning of the space of the input quantities, but also acquires directions located therebetween.

According to a particularly simple variant, it is provided that the modification of the input quantities for the calculation and determination at the system in a first stage is carried out by a predetermined size at each step, whereby only one input quantity respectively changes, and the measurement and the compensation with the model function takes place separately for each modified input quantity, and, after modification of all input quantities, for the next step the system is set to the combination of input quantities that are closest to the optimal value for the output quantity.

According to an advantageous development of this variant of the method, it is provided that the input quantities are modified by the first predetermined size until—while maintaining the secondary conditions—there occurs no further improvement, in the direction of the optimal value, of the output value measured at the system and calculated on the basis of the model function. In this way a rapid approximation to the approximate combination of input quantities for the optimal value of the output quantity is possible.

In order, after closing in on the optimal value of the system on the coarse grid, to determine this value with a selectable degree of precision, in a second stage the modification of the input quantities for calculation and value determination at the system is carried out at each step by a second predetermined size that is smaller than that of the first stage; that is, using the same procedure as in the first stage, the evaluations are carried out at the system directly around the optimum, until the value of the model calculation agrees with the actual values with a selectable degree of precision.

Advantageously, only one input quantity is also thereby respectively modified if one of the surrounding points on the coarse grid cannot be set, or all input quantities are modified simultaneously if this is not the case, and the value determination is carried out at the system, and the compensation with the model function takes place separately for each modified input quantity, and, after modification of all input quantities, for the next step the system is set to the combination of input quantities that are closest to the optimal value for the output quantity. If—as is also the case in the first stage—the points surrounding the optimum on this grid are also measured, the risk of determining a merely local optimum can thereby be avoided.

According to a further feature of the invention, it can however also alternatively be provided that all possible combinations of input quantities in a particular region around the starting point of the second stage are set one after the other, and in this way the overall space of variables in the selected region is scanned. This feature likewise ensures a rapid determination of the actual optimal value with a selectable degree of precision. In addition, by scanning the overall variable space it is ensured that the global optimum has been determined.

So that the optimization also yields the actual optimal value with the highest degree of reliability, according to a further inventive feature, the steps of the second stage are repeated until the system is finally set to the variables that, while maintaining the secondary conditions, yield the optimal value for the output quantity in the selected region.

It is thereby advantageously provided that the modification of the input quantities for the second stage takes place in a plurality of steps, by an overall maximum of the amount that corresponds to the predetermined size of the first stage. This feature avoids redundant measurements and calculations for combinations of input values that were already taken into account in the rapid approximation.

If it is provided that the values from the system are compensated using model functions that are maximally of second order, a simple, inexpensive, and thereby very rapid calculation of the model functions is possible. Due to the fact that in practice the variation space is generally very limited, given arbitrary second-order functions it is seldom the case that a plurality of solutions occur, but by means of the possible limitation to exclusively convex quadratic models it can be ensured that the optimization task will have only one solution. Of course, however, in principle all types of functions, mathematical and even physical models can be taken into account, such as spline functions or neural networks. There is also for example the possibility of having the order of a polynomial model determined automatically with the aid of statistical methods.

A simpler start for the optimization results from the additional inventive feature that in the first step of the first stage the values from the system are compensated using a first-order model function. The first variation of each input quantity is thereby advantageously carried out in the direction towards the center of the variation space. By means of "intelligent placement" of the measurement points, i.e., distribution of the measurement points determined using statistical methods, the first measurement points can already be placed in such a way that the subsequent model calculation becomes still more precise, or, respectively, that a good model for the real system is obtained with as few measurements as possible.

Impermissible states of the system, and destructions therein in the case of real systems, can be prevented in that the system monitors during each modification of an input quantity, and stops and cancels the modification if predetermined boundary values for previously specified secondary conditions are exceeded, and stores in a database the combination of input quantities that was not realized due to this intervention, and blocks this combination for the further optimization. On the basis of hard limits, for example in a test bench system, it is not certain from the outset whether or not an arbitrary combination of the input quantities will destroy the motor or parts thereof. The adjustment of the variation parameters is therefore controlled with the aid of various rules in such a way that a destruction of the motor is reliably avoided. Since it is always the case that in each stage of the optimization method only a single variation parameter is adjusted in a new step, limit infringements can unambiguously be allocated to their causes.

BRIEF DESCRIPTION OF THE DRAWINGS

In the following specification, the invention is explained in more detail with the aid of an exemplary embodiment, with reference to the attached drawings.

DETAILED DESCRIPTION OF THE PREFERRED EMBODIMENTS

Figure 1:
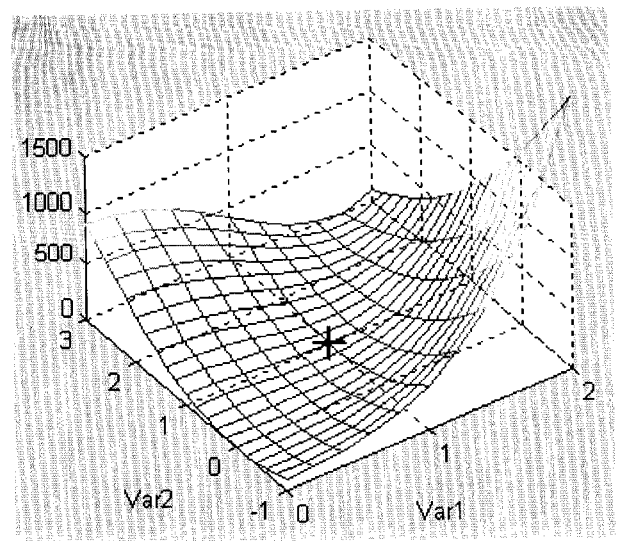
FIG. 1 shows the curve of a function to be optimized of a technical system, such as for example an internal combustion engine, dependent on two input quantities.

A preferred example for the application of the specified optimization method, the procedure thereby provided, and algorithms that are preferably used for online optimization, is for example an internal combustion engine located on an engine test bench. The specified method is suitable for stationary optimization, i.e., during the optimization the engine is in a stationary operating point (RPM and torque are kept constant), while arbitrarily many other parameters of the engine electronics are adjusted and optimized (for example, rate of exhaust gas recirculation, advance angle, . . . ). The communication of the optimizer with the test bench takes place via a flexible interface that makes the measurement and setting of test bench values very simple. Besides the optimization of real systems, the inventive method can however also be used for the optimization of simulation systems, in which for example an internal combustion engine is simulated using a software program, whereby in this case the operating conditions and effects thereby simulated can be optimized using the method specified below. Instead of a measurement of a real system, here the values are determined from the simulation system.

The algorithm with which the input quantities—which simultaneously represent the variation parameters of the model function for the system to the optimized—are modified is distinguished by very particular properties from the majority of already-known optimization algorithms.

The measurement values—or simulated values—supplied from the process for the function to be optimized standardly have stochastic and systematic errors. The ensemble of these errors causes disturbances in the target function that are of high frequency and have low amplitudes, thus modifying the idealized target function that is to be optimized in such a way that an optimization becomes very difficult. If the gradients for the target function disturbed in this way were to be determined with the aid of partial derivatives, one would run the risk of being led in the wrong direction due to the strong influence of the disturbances, thus missing the global optimum. There is a risk of getting stuck in local minima. For the described task, the use of a gradient search method (also known as line search) supplies false, non-reproducible results as soon as the measurements are affected by disturbances, which is practically always the case. On the other hand, given disturbance-free measurement values gradient formation would best be suited for the determination of the optimal search path in the direction of the optimum of the target function. For the model-based optimization method used here, which represents a modified form of the MAPS algorithm (Model Assisted Pattern Search), with the aid of a model function (second-order polynomial model) the actual process is simulated and optimized in parallel fashion. These models are able to compensate the occurring disturbances, and an optimization can be carried out with the aid of this replacement function, as it is called.

In grid search methods, each new variation of the input quantities may be carried out only on a predefined grid. This ensures the convergence of the method. Under certain circumstances, the size of the grid can also be redefined. It is now not possible to set any arbitrary adjacent point on this grid as the next one; rather, it is always the case that only one input quantity may be adjusted in the positive or negative direction at the same time. This procedure is also known as coordinate search.

Furthermore, optimization methods using a replacement function are known. Since every measurement of the actual process results in additional high costs (setting the new variations in the running engine, stabilization, measurement and retrieval of the measurement values), instead of the original target function a replacement function (a model) is used that approximates the target function in the region of interest as well as possible. As a model, a second-order polynomial function is used, which can be found using the method of the least error squares. The advantage is that the minimum of this replacement function can be determined significantly faster and without additional costs. Since this replacement function also makes available items of information concerning the target function that lie outside the already-measured region (extrapolation), here one also speaks of a DACE design (Design and Approximation of Computer Experiments). In the following, this concept is explained in more detail.

The concept of MAPS (Model Assisted Pattern Search) is used particularly when the number of measurements of the process is to be kept as low as possible. Since the target function is hereby approximated over the entire variation space, the newly acquired measurement values from the process are immediately used to improve the original approximation. The search strategy of MAPS, which results in the finding of the next combination of variations, is a part of the algorithm used here. The current approximation of the target function is used to determine a further limited region of interest from the overall variation space. That is, the direction is found in which the target function is expected to assume smaller values. After the next adjustment in this limited region, new measurement values are acquired and the approximation function for the target function is recalculated. Since the new measurement makes available more data for the approximation, the quality of the model (and therewith the precision of the calculated optimum) increases with each additional measurement step.

The inventive optimization specified here is carried out in an orthogonal region that is determined by the definition of upper and lower limits for the individual variation parameters. Normally it is possible to carry out measurements in each point of this region, and thereby to determine values for the target function. However, it can also occur that in certain regions operating states at the engine prevail that could cause destruction or at least endangerment of the engine. If predefined boundary values are exceeded or fallen below, this is called an infringement of a boundary value. If a boundary value infringement occurs, the measurement at this point is invalid. In addition, in the further search for the optimum a combination of adjustments that has resulted in a boundary value infringement is not set again.

The following strategies are used as search strategies:

STRATEGY A:

At the start of the iteration, the algorithm must determine some initial values by measurement. Since at this time there is still no target direction for the iteration, it is assumed that adjustment should take place exactly once in each coordinate direction. In this way, it is possible to calculate a first-order regression model of the sought function. In addition, the limited minimum of this model indicates to the algorithm the direction of descent. The variation procedure must take into account that coordinate combinations that have already successfully been verified are not set again.

STRATEGY B:

This strategy defines how the next iteration is determined on the basis of the minimum of the replacement function. The general rule for the coordinate search runs as follows: Find and adjust each coordinate that leads most rapidly to the minimum of the replacement function. Of course, situations can occur in which it is not possible to make an adjustment in this "steepest" coordinate direction. For example, this is the case if the minimum is found outside the permissible range of variation. If the current iteration point is already located at the edge of the permissible region, the application of this rule will force the search path out of this region. For this reason, the search strategy must avoid this situation. Since the quality of the replacement function increases with the number of measurements carried out at different iteration points, the strategy should prefer points at which measurement has not yet taken place. It could also be argued that multiple measurements would likewise lead to an improvement of the replacement function through the reduction of stochastic measurement errors. However, the main goal of each iteration is to carry out measurements at those points at which a maximum gain of information for the increasing of the model quality is to be expected. For this reason, the search strategy prioritizes not-yet-measured points over already-measured ones: not-yet-measured points are to be preferred over already-measured points.

Impermissible points present another problem. These are points at which a boundary value infringement occurs during the measurement process. As mentioned above, these points must be excluded from the set of possible variations. Points at which boundary value infringements have been detected are excluded from the search.

In the minimization of a target function by coordinate search, the strategy must always supply a candidate for the next variation. Otherwise, the search would be interrupted, and the algorithm would be in a state in which the quality of the current solution is not determined. In this way it can also happen that variation takes place from the minimum of the replacement function, if the direct path thereto is not permissible.

Adjacent points are sorted according to priority, and the best of them is selected.

The rules stated above give an overview of the search strategy, which essentially pursues a local approach: the properties of the points immediately adjacent to the current variation point on the variation grid yield, together with the position of the minimum of the replacement function, the next iteration point.

STRATEGY C:

This strategy is used to find an iteration point on the fine grid. Here as well, the goal is to approach the minimum of the replacement function as quickly as possible. However, in this process a coordinate search is no longer used; rather, variation instead takes place simultaneously in a plurality of coordinate directions. Two situations are thereby to be distinguished: given a boundary value infringement in the environment of the current point, iteration takes place in the direction of the minimum with a small step width. If no boundary value infringement is present in the environment of the current point, progress is made directly to the minimum of the replacement function. The inventively applied optimization algorithm uses mathematical models (linear or quadratic polynomial models) in order to compensate the occurrent measurement scatterings in the target function of the real system that is to be optimized, for example the internal combustion engine on the test bench. For the sake of simplicity, we have assumed that the target function and restrictions have a square quadratic behavior. Of course, the results obtained will be less precise (i.e., the calculated minimum will deviate further from the actual minimum) the more the actual behavior of the functions deviates from the square behavior. In this case, the modeling with quadratic functions would yield imprecise optima. The danger that this deviation will be large is greater, the larger the pre-specified variation space is.

It is true that this imprecision could be counteracted by increasing the order of the models; on the other hand, an increasing of the order of the model would have the result that a significantly higher number of measurement values would be required in order to obtain somewhat reliable results, which in turn contradicts the requirement that the optimum be reached with as few measurements as possible.

An optimization method as specified above can in many cases be improved in that at the beginning a somewhat larger region in the variation space of the input quantities is carefully "scanned" in a predefined pattern, which however can in principle be selected freely. The findings determined using this method have the subsequent result, due to the statistically better model formation, that in the subsequent, second stage, fewer measurements or, respectively, determinations of system values are required in order to find the optimum for the model function. The patterns typically consist of a number of points in the variation space, which points are approached in a predetermined sequence, whereby in order to reach each point a number of steps is required that is determined by a step width, which is not to be exceeded, for the input quantities. This step width can be individually predetermined for each quantity, whereby various maximum step widths can therefore also be predetermined for the various input quantities.

It is also not absolutely necessary that only one input quantity always be modified per step, that is, that the steps be placed orthogonally; rather, steps can also take place at an arbitrary angle between the axes. However, corresponding to the principle that the maximum step width for the individual input quantities may not be exceeded, the absolute step width is thereby determined by the step width of that one of the modified input quantities that, of these quantities, has the smallest predetermined step width.

Finally, the above principles are clarified on the basis of a practical example.

Assume a function f(x) that is to be minimized: minimize $f(x)$ so that the following holds:

$x0B/\{x^*a\#x\#b\}$, whereby $f:R^n 6R\chi\{4\}, a, b0R^n$.

The function used here is the "banana function" of Rosenbrock, which has long been known in optimization technology. The function value of f is calculated from the equation:

$$f(x)=100 \cdot (x_2-x_1^2)^2+(1-x_1)^2$$

Moreover, another uniformly distributed stochastic interference function having a maximum amplitude of ±2 was added to this function.

Figure 3:
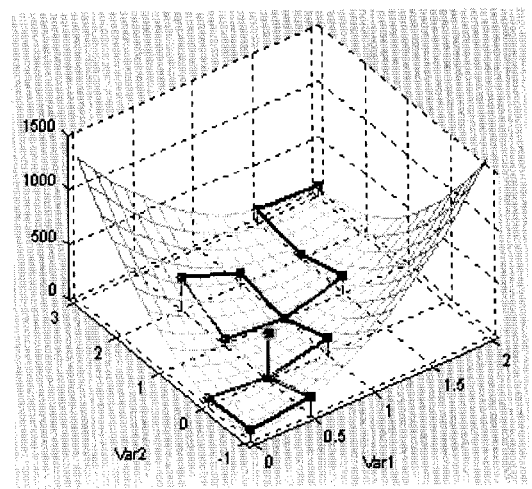
FIG. 3 shows the model function, the associated measurement values, and the search path of the optimizer.

FIG. 1 shows the curve of the function dependent on the variation parameters in the interval of $\{x_1^* 0\#x_1\#2\}$ and $\{x_2^*-1\#x_2\#3\}$. The function is distinguished by a region having a particularly flat gradient, in which the optimum is located at the point [1, 1]. The indicated interval of the variation parameters was selected such that the function can still be imitated with sufficient precision by a second-order model. The corresponding model function, the associated measurement values, and the search path of the optimizer are shown in FIG. 3.

As a starting value, the point [2, 3] was chosen, and the coarse grid is determined by five variations in each direction. There thereby results a maximum step width of 0.5 in the $x_1$ direction and a maximum step width of 1 in the $x_2$ direction. The maximum step width results from the coarse grid. The coarse grid results through predetermination of the minimum and maximum values as well as the number of subdivisions (or step width calculated thereby) for each variation parameter. For the first stage, this means that the variations are set to a point that is immediately adjacent to the current "standpoint," and at the same time is the point closest to the point that is believed to be the optimum.

The expression "fine grid" is in itself confusing, since in this phase the variations are not, analogous to the previous procedure, set directly at fine grid points; rather, they are set directly to the optimum, insofar as the optimum does not wander again to a point further removed from the current standpoint due to additional measurements and modified models. In the case of such wandering, the coarse grid method would again be used to travel to this new optimum. The fine grid is used only when a coarse grid point with boundary value infringement is located immediately in the vicinity of the optimum. One then proceeds with this fine grid step width in the direction of the optimum, and thus in the direction of a known boundary-value-infringed point.

Figure 2:
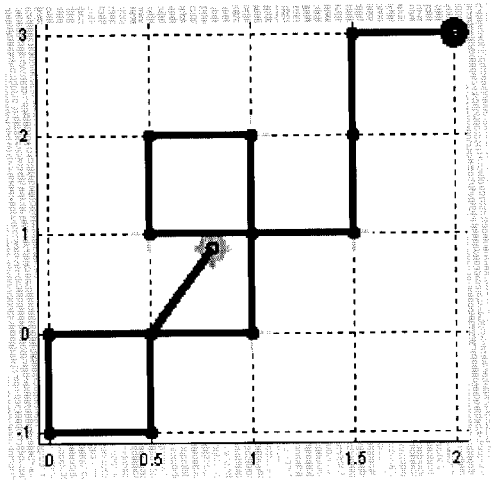
FIG. 2 shows the search path for the optimization of the system.

The optimization method terminated after 16 iterations at an optimum value of 3.8 with the variation combination of [0.81, 0.85] (as opposed to an actual 0 at [1, 1]). FIG. 2 shows the search path, beginning at [2, 3], to the calculated optimum, dependent on the two variation parameters. The slight deviation from the actual optimum is due on the one hand to the imprecision of the model, which cannot ideally map the predetermined function, and on the other hand to the influence of the applied interference function.

It is more often possible to move from a measurement and modeling point A to the next point B in the same number of steps. In this case, the path is preferred that has not yet been measured, since a measurement is carried out after each variation in any case. If this measurement is therefore made at a point at which no measurement was previously made, the certainty that the optimum is in fact global is thereby increased.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for an automatic optimization of an output quantity of a system that is dependent on a plural number of input quantities, with maintenance of secondary conditions, comprising the steps:

determining a theoretical value for the output quantity and for the secondary conditions on a basis of a respective model function having the input quantities as variables, in successive individual steps, respectively modifying one of the input quantities inside a variation space having a dimension corresponding to the number of input quantities, determining values, corresponding to the respective input quantities, for the output quantity and for the secondary conditions directly at the system, and using the determined values for a correction of the model function, until the model function has achieved its optimal value, fulfilling the secondary conditions, for the output quantity, in a first stage modifying the input quantities for a calculation and determination at the system in an arbitrarily predetermined sequence, maintaining for each input quantity a step size which does not exceed an individual predetermined step size, and after the predetermined sequence has been processed, using as a starting point for a second stage a combination of input quantities that is closest to the optimal value.

2. A method according to claim 1, characterized in that the step of modifying the input quantities for the calculation and determination at the system in the first stage is carried out by a predetermined size at each step, whereby only one input quantity respectively changes, and a measurement or, respectively, value determination at the system, and a compensation with the model function takes place separately for each modified input quantity, and, after modification of all input quantities, for a next stage the system is set to the combination of input quantities that is closest to the optimal value for the output quantity.

3. A method according to claim 2, characterized in that the input quantities are modified by a first predetermined size until, while maintaining the secondary conditions, there occurs no further improvement, in a direction of the optimal value, of the output value measured at the system and calculated with the model function.

4. A method according to claim 1, characterized in that in a second stage the modification of the input quantities for calculation and determination at the system is carried out at each step by a second predetermined size that is smaller than that of the first stage.

5. A method according to claim 4, characterized in that only one input quantity is respectively modified if one of the surrounding points on a coarse grid cannot be set, or all input quantities are modified simultaneously if this is not the case, and the value determination is carried out, and a compensation with the model function takes place separately for each modified input quantity, and, after modification of all input quantities, for the next stage the system is set to the combination of input quantities that are closest to the optimal value for the output quantity.

6. A method according to claim 4, characterized in that all possible combinations of input quantities in a particular region around the starting point of the second stage are set one after the other, and in this way an overall space of variables in the particular region is scanned.

7. A method according to claim 4, characterized in that steps of the second stage are repeated until the system is finally set to the variables that, while maintaining the secondary conditions, yield the optimal value for the output quantity in a selected region.

8. A method according to claim 4, characterized in that the modification of the input quantities for the second stage takes place in a plurality of steps, by an overall maximum of an amount that corresponds to the predetermined size of the first stage.

9. A method according to claim 1, characterized in that the values from the system are calculated using model functions that are maximally of second order.

10. A method according to claim 9, characterized in that in the first step of the first stage the values from the system are calculated using a first-order model function.

11. A method according to claim 1, characterized in that the system monitors during each modification of an input quantity, and stops and cancels the modification if predetermined boundary values for previously specified secondary conditions are exceeded, and stores in a database a combination of input quantities that was not realized due to this intervention, and blocks this combination for any further optimization.

12. A method according to claim 1, characterized in that the system that is dependent on a plural number of input quantities is an internal combustion engine.

13. A method for an automatic optimization of an output quantity of a system that is dependent on a plurality of input quantities with maintenance of secondary conditions, comprising the steps:

determining a theoretical value for the output quantity and for the secondary conditions on a basis of a respective model function having the input quantities as variables, in successive individual steps modifying one of the input quantities inside a variation space having a dimension corresponding to the number of input quantities, and determining values, corresponding to the respective input quantities, for the output quantity and for the secondary conditions, directly at the system and using the values for a correction of the model function, until the model function has achieved its optimal value, fulfilling the secondary conditions, for the output quantity, wherein in a first stage, modifying the input quantities in an arbitrarily predetermined sequence, maintaining, for each input quantity, an individual predetermined step size no greater than a predetermined maximum size, and after a predetermined sequence of the successive individual steps has been processed, using a combination of input quantities that is closest to the optimal value as a starting point for a subsequent stage.

14. A method according to claim 13, wherein the step of modifying the input quantities for the calculation and determination at the system in the first stage is carried out by a predetermined size at each step, whereby only one input quantity respectively changes, and the measurement or, respectively, value determination at the system, and the compensation with the model function, takes place separately for each modified input quantity, and, after modification of all input quantities, for the next step the system is set to the combination of input quantities that are closest to the optimal value for the output quantity.

15. A method according to claim 14, wherein the input quantities are modified by the first predetermined size until, while maintaining the secondary conditions, there occurs no further improvement, in the direction of the optimal value, of the output value measured at the system and calculated on the basis of the model function.

16. A method according to claim 15, wherein in the subsequent stage the modification of the input quantities for calculation and determination at the system is carried out at each step by a second predetermined size that is smaller than that of the first stage.

17. A method according to claim 16, wherein only one input quantity is respectively modified if one of the surrounding points on the coarse grid cannot be set, or all input quantities are modified simultaneously if this is not the case, and the value determination is carried out, and the compensation with the model function takes place separately for each modified input quantity, and, after modification of all input quantities, for the next step the system is set to the combination of input quantities that are closest to the optimal value for the output quantity.

18. A method according to claim 16, wherein all possible combinations of input quantities in a particular region around the starting point of the second stage are set one after the other, and in this way the overall space of variables in the selected region is scanned.

19. A method according to claim 16, wherein the steps of the subsequent stage are repeated until the system is finally set to the variables that, while maintaining the secondary conditions, yield the optimal value for the output quantity in the selected region.

20. A method according to claim 16, wherein the modification of the input quantities for the subsequent stage takes place in a plurality of steps, by an overall maximum of the amount that corresponds to the predetermined size of the first stage.

21. A method according to claim 13, wherein the values from the system are compensated using model functions that are maximally of second order.

22. A method according to claim 21, wherein in the first step of the first stage the values from the system are compensated using a first-order model function.

23. A method according to claim 13, wherein the system monitors during each modification of an input quantity, and stops and cancels the modification if predetermined boundary values for previously specified secondary conditions are exceeded, and stores in a database the combination of input quantities that was not realized due to this intervention, and block this.

* * * * *